United States Patent
VanOrder et al.

[19]

[11] Patent Number: 5,887,485
[45] Date of Patent: Mar. 30, 1999

[54] VEHICLE CONSOLE WITH BUILT-IN VEHICLE TRANSMISSION SHIFTER HAVING CABLE TENSION ADJUSTMENT MECHANISM AND METHOD

[75] Inventors: Kim L. VanOrder, Hamilton; Kenneth M. Lindberg, Holland, both of Mich.

[73] Assignee: Prince Corporation, Holland, Mich.

[21] Appl. No.: 886,571

[22] Filed: Jul. 1, 1997

[51] Int. Cl.⁶ .................................................. F16H 59/04
[52] U.S. Cl. .................... 74/473.15; 74/473.28; 74/473.3; 74/502.6; 74/538; 29/469
[58] Field of Search ................... 29/469; 74/473.15, 74/473.28, 473.3, 538, 502.6

[56] References Cited

U.S. PATENT DOCUMENTS

| | | | |
|---|---|---|---|
| 3,863,520 | 2/1975 | Moline et al. | 74/475 |
| 4,116,086 | 9/1978 | Langford et al. | 74/532 |
| 4,566,349 | 1/1986 | Van der Loon et al. | 74/475 |
| 4,821,593 | 4/1989 | Kobylarz | 74/475 |
| 4,955,251 | 9/1990 | Reinert et al. | 74/501.5 R |
| 4,977,789 | 12/1990 | Osborn | 74/475 |
| 4,986,143 | 1/1991 | Livshits et al. | 74/475 |
| 5,027,673 | 7/1991 | Behrens et al. | 74/473 R |
| 5,079,966 | 1/1992 | Ishizuki et al. | 74/473 |
| 5,106,143 | 4/1992 | Soeters | 296/37.8 |
| 5,207,124 | 5/1993 | Anderson et al. | 74/878 |
| 5,277,077 | 1/1994 | Osborn | 74/475 |
| 5,417,126 | 5/1995 | DeCrouppe et al. | 74/475 |
| 5,505,103 | 4/1996 | Nordstrom et al. | 74/473 P |
| 5,662,004 | 9/1997 | Osborn et al. | 74/538 X |
| 5,682,789 | 11/1997 | DeCrouppe et al. | 74/538 X |

FOREIGN PATENT DOCUMENTS 3210319  10/1983  Germany .

*Primary Examiner*—Allan D. Herrmann
*Attorney, Agent, or Firm*—Price, Heneveld, Cooper, DeWitt & Litton

[57] ABSTRACT

A vehicle console assembly adapted to be installed in a vehicle with a shifter assembled in the console and including a structure for adjusting the tension on the transmission cable to which the shifter assembly is connected. The shifter assembly includes a detent element movable initially when the console assembly is installed so that the tension in the transmission cable can be adjusted by moving the detent element after which adjustment the detent element is locked in place preferably by a trim plate mounted on the housing of the console. This invention includes the method of adjusting the tension on the transmission cable utilizing the above described structure.

22 Claims, 6 Drawing Sheets

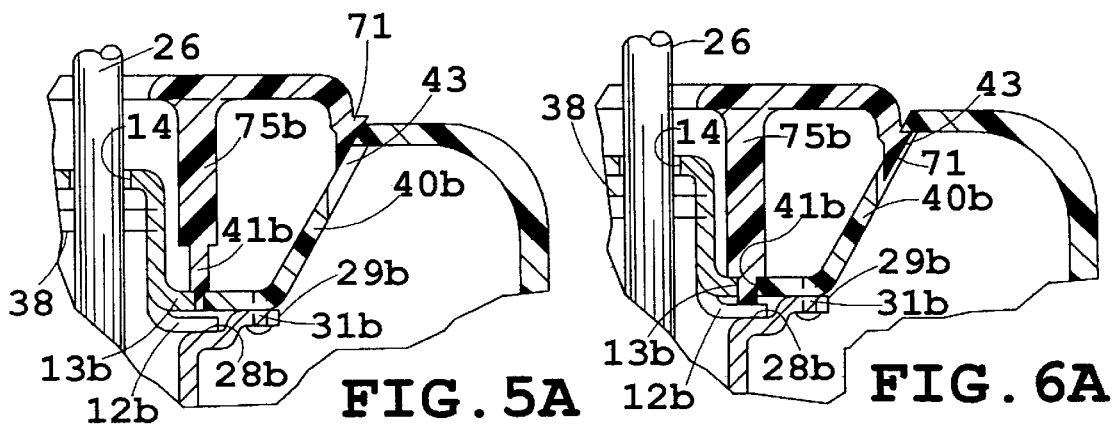
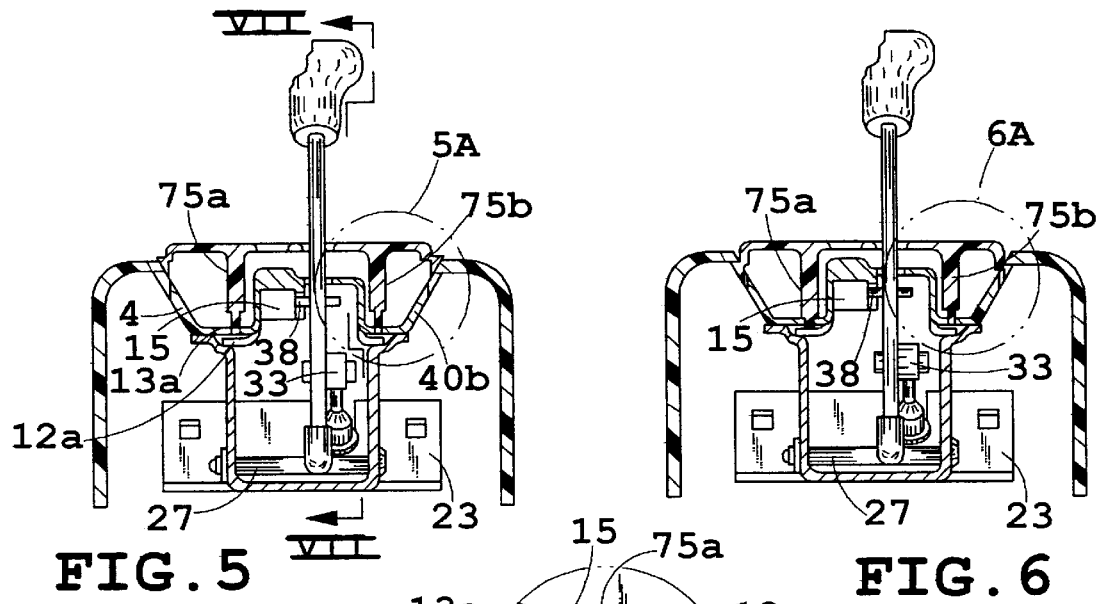
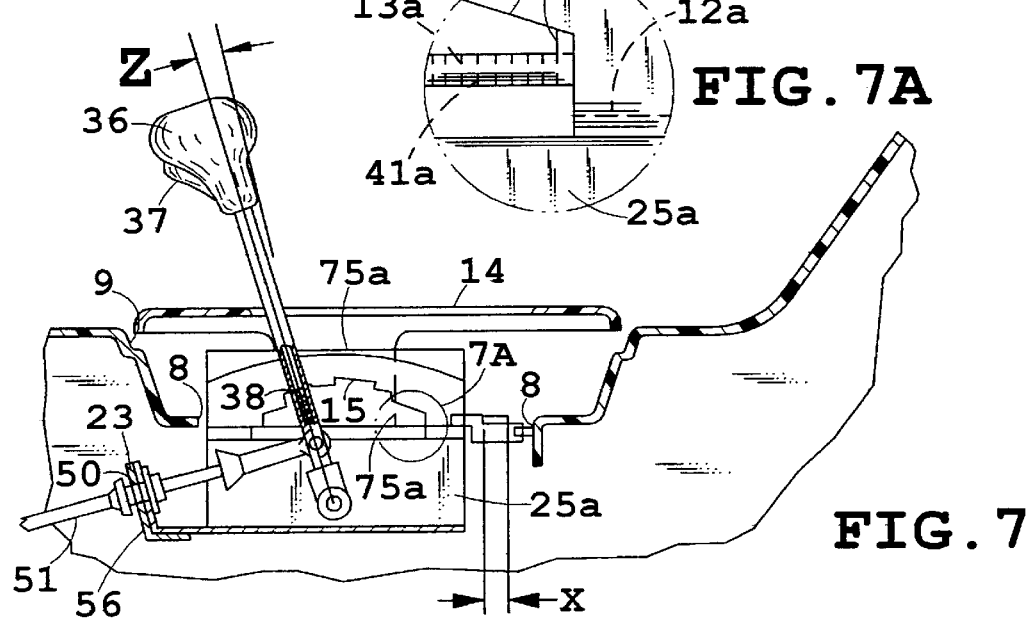

VEHICLE CONSOLE WITH BUILT-IN VEHICLE TRANSMISSION SHIFTER HAVING CABLE TENSION ADJUSTMENT MECHANISM AND METHOD

This invention relates to a vehicle console in which is incorporated a vehicle transmission shifter having a cable tension adjustment mechanism. It also relates to a method for adjusting the tension on a transmission cable. More particularly, this invention relates to such a vehicle console which is installed while the vehicle transmission shifter is contained within the console and the transmission shifter is snap connected to a cable connector extending from the transmission after which the adjustment in the cable tension is made from the outside of the console housing.

BACKGROUND OF THE INVENTION

Heretofore, there has been developed by a vehicle transmission manufacturer a shifter mechanism for a simple and quick connect of a vehicle transmission shifter to the cable of a vehicle transmission. Briefly, this mechanism includes a shift lever pivotally mounted to several different gear positions including "Park," "Reverse," "Neutral," and "Drive" which positions are established by a detent plate or element. Extending from the shift lever is a rod having a connector on the end which mates with a connector attached to the transmission cable. This mechanism is constructed so that the lever shift mechanism can be snapped into position for connecting to and actuating the cable. The shifter allows the operator to shift between operating positions, such as "Park," "Reverse," "Neutral," and "Drive" gear positions. It is important that the operating length of the transmission shift cable be properly adjusted so that the vehicle transmission will shift to a desired operating position when the shifter is moved. Even a few millimeters of misadjustment can cause significant and improper positioning of the shifter relative to the operating positions of the transmission, resulting in customer dissatisfaction and warranty expense. If the shifter is located within the console prior to assembly of the console in the vehicle, adjusting the shifter relative to the transmission shift cable has been virtually impossible without removing the housing of the console. Further, it has been virtually impossible to manufacture the cable connector mechanism extending from the transmission cable and the cable connecting mechanism of the shifter with sufficiently close tolerances because of the variances in the component tolerances and also because of the variations that occur during assembly of the vehicle.

Therefore, it has been desirable to design a combination console and shifter mechanism in which the shifter mechanism is mounted within the housing of the console and the assembly of the console with the shifter mechanism therein can be installed simultaneously as one unit and thereafter the tension in the transmission cable can be properly adjusted so that the shifter mechanism will shift the vehicle transmission to the proper operating positions.

SUMMARY OF THE INVENTION

In accordance with the present invention, there is provided a unique vehicle console assembly adapted to be installed in a vehicle with a shifter assembly assembled in the console housing and during such installation, the shifter assembly is connected to a transmission cable of a vehicle transmission. The shifter assembly is substantially of a type designed by others except for a uniquely constructed detent element that is movable within the housing of the console for adjusting the tension on the transmission cable. It includes a shift lever pivoted relative to the console and having a cable connector rod movable with the shift lever. A detent element is provided for locating the shift lever in different pivoted transmission gear positions. The entire shifter assembly is adapted to snap-in and be connected to a base secured to the floor of the vehicle with the connector rod being simultaneously connected to a transmission cable connector mounted on the floor of the vehicle. The present invention involves a detent element which is movable relative to the console prior to and for adjustment of the tension in the transmission cable. As the result, after the cable connector rod is connected to the transmission cable, the detent element is movable along with the shift lever connected to the detent element which is the initial gear position at which the transmission cable is set. The movable detent element permits adjustment of the tension in the transmission cable after which a locking mechanism locks the detent element to the module so that the proper tension is exerted on the transmission cable.

More specifically, our invention relates to a console assembly having an adjustable detent element having an elongated lever opening for receiving a lever of a transmission shifter. The detent element includes a plurality of detent notches for receiving a pawl of the transmission shift lever which positions the lever in one of different gear positions. The console assembly includes a trim plate having a lever opening for receiving the lever of the transmission shifter. The trim plate fits into a portion of an opening in the console housing. The detent element also is movably received within a portion of the console housing opening. The console housing, detent element, and trim plate all have cooperative locking elements for locking the detent element in an adjusted position wherein the tension in the transmission cable is properly adjusted. The locking takes place when the trim plate is pushed into the housing opening to lock it and the detent element in place.

Our invention also involves the method of adjusting the tension of the shifting cable for a vehicle transmission by providing the above structure and with the transmission of the vehicle in one of the transmission gear positions with the pawl in one of the notches of the detent element corresponding to the said transmission gear position, the console is installed. During such installation, the shift lever cable connector rod is connected to the transmission cable after which the detent element and shift lever are moved to adjust the tension in the transmission cable after which the detent element is locked in place, preferably by pushing the trim plate to engage the locking member of the trim plate with the detent element and console.

It should be evident from the above "Summary of The Invention" that our invention permits the assembled console to be installed in the vehicle while the shifting mechanism is contained within the housing of the console and the tension on the transmission cable can thereafter be adjusted without removing the housing. These objects and others will become more clearly evident by the drawing and description of the preferred embodiment which follows.

BRIEF DESCRIPTION OF THE DRAWINGS

FIG. 5 is a cross-sectional view taken along the plane V—V of FIG. 4;

FIG. 5A is an enlarged view of a designated portion of FIG. 5;

FIG. 6 is a cross-sectional view like that of FIG. 5 but with the trim plate in locked position;

FIG. 6A is an enlarged view of a designated portion of FIG. 6;

FIG. 7 is a cross-sectional view taken along the plane VII—VII of FIG. 5;

FIG. 7A is an enlarged view of a designated portion of FIG. 7;

DETAILED DESCRIPTION OF PREFERRED EMBODIMENT

Figure 1:
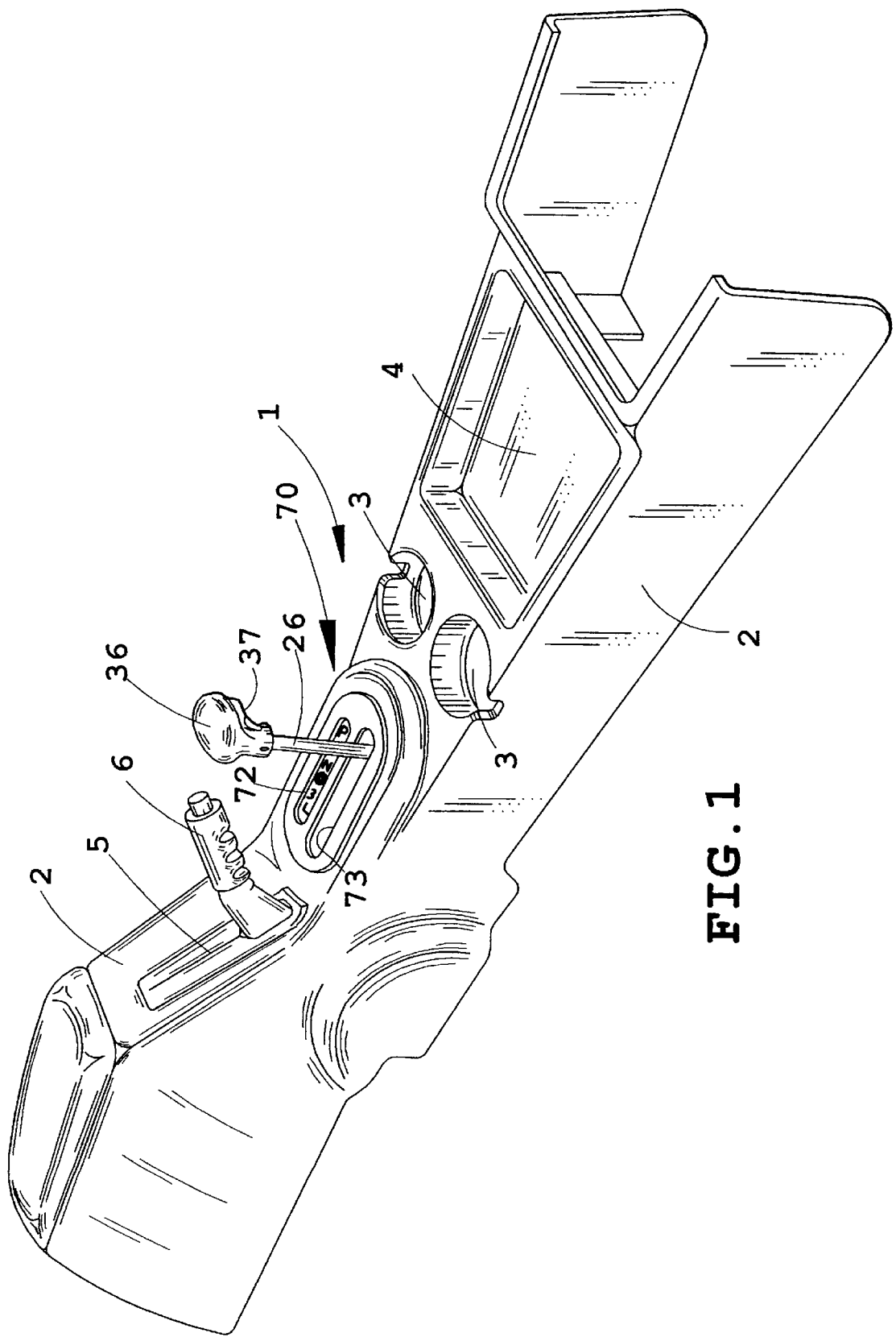
FIG. 1 is a side elevational, perspective view of the console assembly of this invention.

Referring to the drawings, reference numeral 1 designates a floor console assembly which includes a housing 2 constructed of a formed plastic material and adapted to be located between the passenger and drive seat of a motor vehicle. The housing 2 is shaped to include indentations 3 for receiving cups and indentation 4 for receiving miscellaneous articles. Housing 2 also includes a slot 5 through which the handle 6 for a parking brake extends. Housing 2 also includes the opening 7 having two opening portions 8 and 9. Opening portion 8 is shaped to receive a detent element 10, which is a part of the shift assembly 20 as will be described hereinafter.

Figure 4:
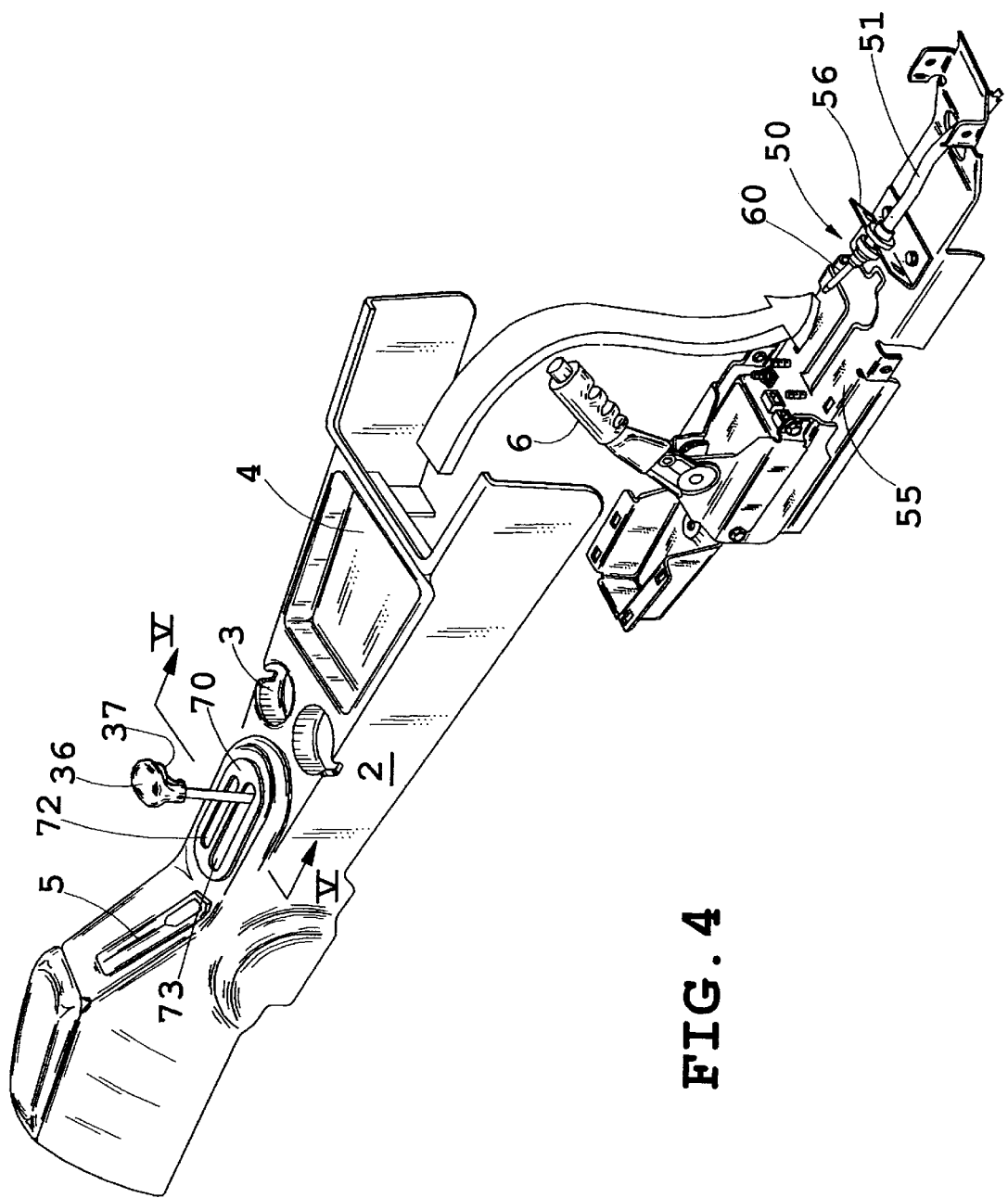
FIG. 4 is a side elevational, perspective, exploded view of the console assembly with the trim plate in unlocked position and illustrating how the console assembly is installed on the support base which includes the transmission cable connector mechanism.
Figure 8:
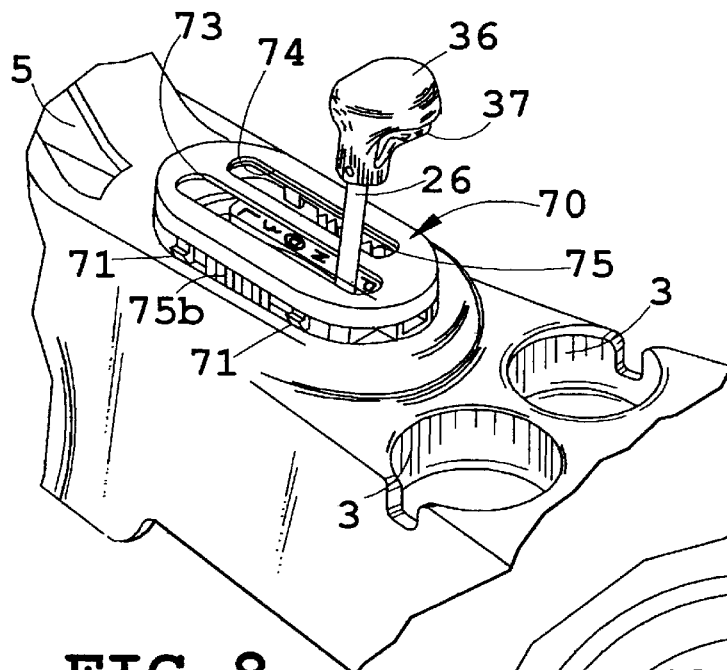
FIG. 8 is a partial perspective view of the console disclosing the trim plate in the unlocked position of FIG. 5.

As disclosed in FIG. 1 and illustrated in FIGS. 5, 6, and 7, shifter mechanism is mounted within the console 1 before installation of the console within the vehicle as illustrated by FIG. 4. During the installation of the console, shift mechanism 20 is adapted to be connected to the cable connector 50 which is a design developed by a third party. Shift mechanism 20 is automatically connected to the transmission cable connector 50 from which the cable 51 extends to the transmission of the vehicle. The present invention involves structure in which the tension on the cable 51 is adjusted. However, before explaining how detent element 10 along with the other components of the console 1 adjusts the tension in cable 51, a brief explanation of the cable connector 50 is in order.

Figure 3:
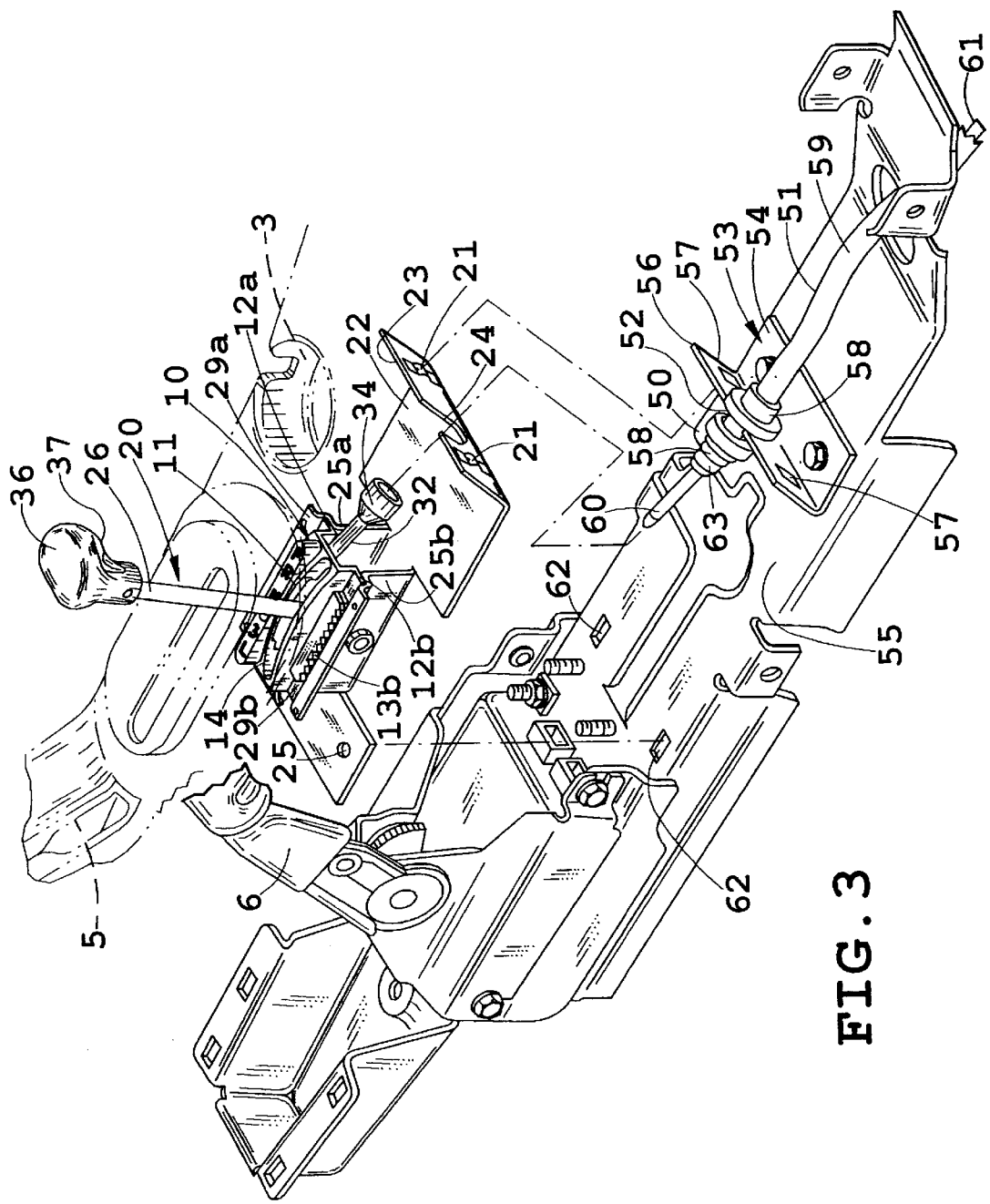
FIG. 3 is an exploded, side elevational, perspective view of the shifter assembly and the base which includes the transmission cable connector mechanism extending from the transmission of the vehicle.

Referring to FIGS. 3 and 4, cable connector 50 includes an anchor 52 mounted on the anchor support flange member 53 which includes flange 54 mounted on the base 55 which in turn is mounted on the floor of the vehicle. Base 55 also supports the parking brake handle 6 extending upwardly from flange 54 is the flange 56 on which the anchor 52 of cable connector 50 is mounted. Flange 56 includes the openings 57 provided to receive clips 21 of the shifter mechanism as will be explained hereinafter.

The transmission cable connector 50 includes a telescopic cable rod 60 extending into the anchor 52 and connected to the inner cable 61 slidably mounted within the inner sheath 59 which is supported on the anchor 52 by outer sheath 58. It should be evident that actuation of the telescopic cable rod 60 will actuate inner cable 61 which is connected to the transmission for shifting the transmission to different gear positions.

Figure 2:
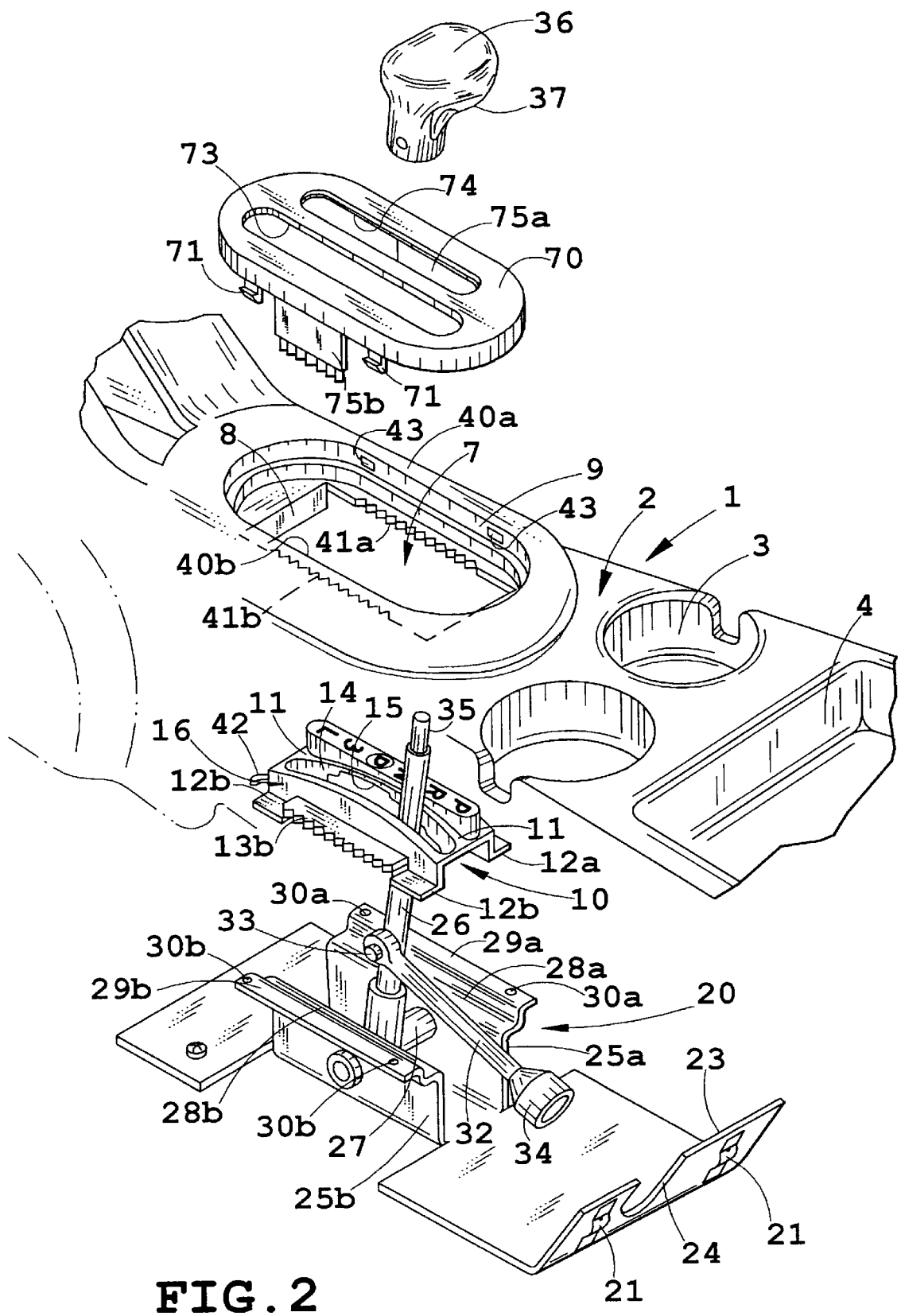
FIG. 2 is an exploded perspective view of the major components of the console assembly of this invention.

Referring to FIGS. 2 and 3, shifter mechanism 20 includes a base 22 having a forwardly located flange 23 inclined at an angle corresponding to the angle of inclination of anchor support flange 56. As previously stated, snap-in clips or Z clips 21 are provided on the face of flange 23. These clips 21 engage the openings 57 for securing flange 23 to flange 56 with the anchor 52 being received within the cutout 24 in flange 23. Similarly shaped clips 25 are located at the rearward end of base 22 so as to engage the openings 62 in the base 55 for securely holding base 22 on base 55. Upstanding flanges 25a and 25b are cutout of the base 22 and extend upwardly to provide spaced supports for shift lever 26 which extends upwardly from the pivotally mounted shaft 27. The top ends of flanges 25a and 25b are bent to an approximate Z-shape to provide horizontal surfaces 28a and 28b on which the detent element 10 is located (FIG. 3) and can slide forwardly or rearwardly. These Z-shaped upper ends of flanges 25a and 25b also provide flanges 29a and 29b with openings 30a and 30b which as disclosed in FIGS. 5a and 6a, receive fasteners 31a and 31b for mounting base 22 to the flanges or walls 40a and 40b extending downwardly from the top of the console housing. These flanges 40a and 40b define the opening portions 8 and 9 of the opening 7 at the top of the console housing (FIG. 2), all of which will be explained hereinafter.

A connector rod 32 is pivotally mounted at 33 on shift lever 26 and extends forwardly. A connector element 34 is mounted on the end of rod 32. Connector element 34 fits over the enlarged end of telescope cable rod 60 and is snap connected thereto so as to connect cable rod 32 to the inner cable 61. As a result, pivoting of shift lever 26 actuates cable 61 to shift the gears of the vehicle transmission.

Shift lever 26 is a hollow tube having an actuator member 35 extending upwardly into the knob 36 which includes a push button 37 for actuating actuator member 35 in a well-known manner. Extending from member 35 is pawl 38 for engaging the detent notches of detent member 10 as will now be described.

Detent element 10 (FIGS. 2 and 3) is hat shaped at both of its ends thereby providing a detent protrusion 16 extending upwardly of flanges 12a and 12b. Detent protrusion 16 has a top surface 11 and locking flanges 13a and 13b are located intermediate the ends, one on each side. These flanges 13a and 13b are located on a plane slightly above the plane of the flanges 12a and 12b and as is disclosed in FIGS. 3, 5, and 6 are located on the same plane as the ends of the inwardly extending flanges or walls 40a and 40b which are located immediately above the top surfaces of flanges 29a and 29b. A slot 14 is provided in the top of detent element 10 to receive shift lever 26 therethrough. Located immediately adjacent the slot on the underside of the top are the detent notches 15 which are provided to receive pawl 38 extending from the side of shift lever 26 to position or locate the shift lever 26 at one of the various gear positions, namely, "Park," "Reverse," "Neutral," and "Drive" positions. These positions "P," "R," "N," "D," "3," and "L" are displayed on the top of detent element so as to designate the various gear positions of the shift lever 26.

Figure 10:
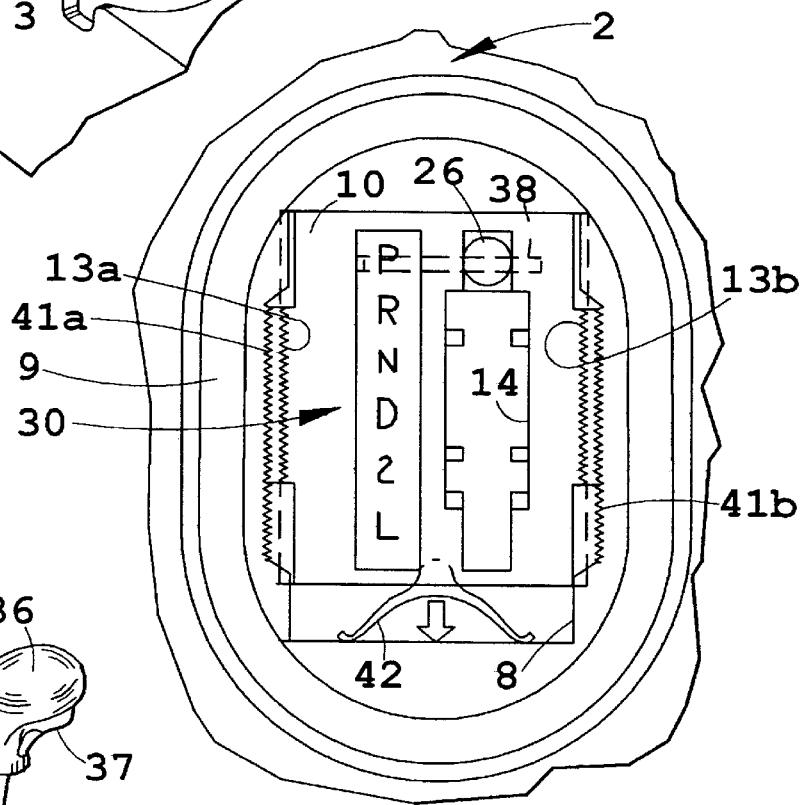
FIG. 10 is a plan view illustrating the position of the detent element within a portion of the opening in the console housing.
Figure 9:
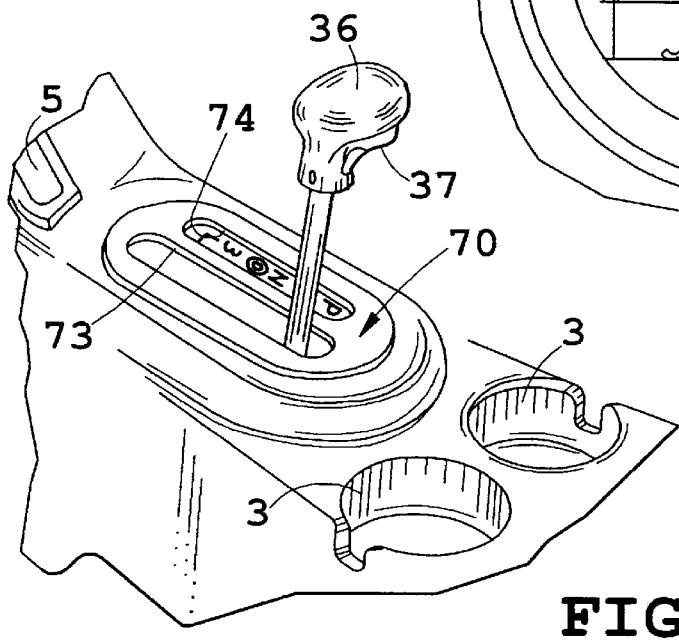
FIG. 9 is a partial side elevational perspective view of a portion of the console disclosing the trim plate in the locked position of FIG. 6.

As previously disclosed, the top of console 1 includes the opening 7 having the opening portions 8 and 9. When the shifter mechanism 20 is initially assembled in the console housing 2, detent element is located in the lowermost housing portion 8 which includes the flanges 40a and 40b extending downwardly from the top of the console (FIGS. 5a and 5b) and then inwardly to terminate at the serrated edges 41a and 41b (FIG. 2). When located within the housing, the serrated edge 13a is on the same plane and are directly opposite the serrated edge 41a and flange 13b is on the same plane and directly opposite the serrated edge 41b (FIGS. 5, 6, and 10). Prior to the time that detent element is locked in place, it is permitted to slide on the surfaces 28a and 28b. As disclosed in FIG. 10, detent element 10 is biased forwardly by spring 42.

Trim plate 70 has the dual function in not only providing a trim but also locking the sliding detent element 10 to the console housing. Trim plate 70 is a relatively flat member of the same shape as the opening portion 9 of opening 7. It fits snugly into the opening portion 9 and includes locking tabs 71 extending downwardly from each side and adapted to engage the openings 43 for retaining the trim plate 70 within the opening 7. Trim plate 70 includes the clearance opening 73 for receiving the shift lever 26 permitting the shift lever to be pivoted for changing the gears of the vehicle. Also, it discloses a "P," "R," "N," "D," and "L" display opening 74 for displaying the indicia "P," "R," "N," "D," "3," and "L" indicating the gear position of the shift lever. An important function of the trim plate is to lock the detent element in place once the transmission cable 61 has been adjusted. This is accomplished by the serrated locking elements 75a and 75b positioned to be inserted between the serrations 13a and 41a and 13b and 41b, respectively, all as illustrated by FIGS. 5a and 6a.

OPERATION

Having disclosed the details of the construction of my console assembly, the operation should be quite evident. Briefly, the shifter mechanism 20 is mounted within the housing 2 of the console 1 in the position as disclosed in FIG. 5. In this position, the shift lever 26 is pivoted to the same gear position as the vehicle transmission, preferably the "Park" position, and is held in that position by the pawl 38 located "Park" detent notch. The trim plate is then arranged in alignment with the opening 7. The console is then in the form as disclosed in FIG. 4, ready to be installed over the base 55.

The next step is demonstrated by FIG. 4, that is, the entire console 1 with the shifter mechanism 20 mounted therein and the trim plate 70 located slightly in the opening 7 is mounted over the base 55. During this mounting or installation step, connector element 34 is inserted over the enlarged portion 63 of the telescopic cable rod 60 and is snap engaged securely to the telescopic cable rod 60 which as previously disclosed, is attached to cable 61. Also during this step, the snap-in clips or Z clips 21 engage the openings 57 to secure flange 23 to flange 56. The rear end of the base 22 is then forced downwardly and the snap-in clips or Z clips 25 engage openings 62 to secure the entire shifter mechanism and the console housing to which the shifter mechanism is attached, to the base 55. In the same step, the brake handle 6 is inserted through the opening 5.

When installed or mounted on base 55, the tension on cable 61 is adjusted by sliding detent element 10 along with shift lever 26 on the surfaces 28a and 28b (FIG. 2). Such adjustment designated by "X" in FIG. 7 is within the range of plus or minus 6 mm. When the proper adjustment has been made, trim plate 70 is pushed downwardly causing the locking elements 75a and 75b to engage the serrations 41a and 41b and 13a and 13b. This locks the detent element in the proper position to provide proper adjustment of the tension in the transmission cable 61. When the trim plate 70 is pushed downwardly into locking position, the tabs 71 engage the openings 43 to retain the trim plate within the upper opening portion 9 of the opening 7. This completes the installation of the console assembly except for perhaps additionally securing it in place by various types of attachment members.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the Doctrine of Equivalents.

The embodiments of the invention in which an exclusive property or privilege is claimed are defined as follows:

1. A console assembly having an adjustable detent element adapted to mate with a transmission shift lever comprising:

said detent element having a first elongated lever opening for receiving said lever, said detent element having a plurality of detent notches for receiving a pawl of said lever;

a trim plate having a second elongated lever opening for receiving said lever;

a console housing having an opening for receiving said detent element and said trim plate;

said housing opening including a first opening portion for movably receiving said detent element permitting adjustment of said detent element in said first opening portion;

said housing opening including a second opening portion located above said first portion for receiving and locking said trim plate therein; and said console housing, detent element and trim plate having cooperative locking elements for locking said detent element in one of various selected adjusted positions as said trim plate is pushed into said first opening portion to establish the position of said detent element and detent notches relative to said console housing.

2. The console assembly of claim 1 in which said first opening portion and said detent element have spaced opposing sides and said trim plate has a locking member protruding downwardly in a position to extend between said sides; said sides and locking member being shaped to lock said detent element in adjusted positions of said detent element within said first opening portion.

3. The console assembly of claim 2 in which said sides are serrated to form combs on each side and said locking member includes surfaces for engaging selected serrated surfaces of said combs to lock the detent element in place.

4. The console assembly of claim 1 in which the detent element includes a detent protrusion extending upwardly from the first opening portion into the second opening portion and said trim plate includes an opening for receiving said detent protrusion; said detent protrusion having detent notches being located on the under surface of said detent protrusion along the elongated first lever opening.

5. The console assembly of claim 2 in which the detent element includes a detent protrusion extending upwardly from the first opening portion into the second opening portion and said trim plate includes an opening for receiving said detent protrusion; said detent protrusion having detent notches being located on the under surface of said detent protrusion along the elongated first lever opening.

6. The console assembly of claim 3 in which the detent element includes a detent protrusion extending upwardly from the first opening portion into the second opening portion and said trim plate includes an opening for receiving said detent protrusion; said detent protrusion having detent notches being located on the under surface of said detent protrusion along the elongated first lever opening.

7. The console assembly of claim 1 in which said first opening portion is of lesser dimension than said second opening portion.

8. The console assembly of claim 7 in which said second opening portion includes downwardly extending spaced side walls and said first opening portion is defined by first flanges extending inwardly of said side walls toward each other, said detent element including second flanges extending toward said first flanges, said first and second flanges having edges, said trim plate having a locking member protruding downwardly in a position to extend between said edges; said edges and locking member being shaped to lock said detent element in adjusted positions of said detent element within said first opening portion.

9. The console assembly of claim 8 in which said first and second flanges have serrated edges; and said locking member extends downwardly from said trim plate and engages said serrations of said first and second flanges for locking said detent element in place.

10. A floor console assembly for a vehicle including a console housing and a shifter assembly assembled in said console housing, said console assembly being adapted to be installed in a vehicle with the shifter assembly in said console housing and during such installation said shifter assembly is connected to the transmission cable of a vehicle's transmission, comprising:

said shifter assembly including a shift lever pivoted relative to said console and having a cable connector movable with said shift lever, and a detent element for locating said shift lever in different pivoted transmission gear positions, said detent element being movable relative to said console prior to and for adjustment of the tension in the transmission cable; and a locking mechanism for locking said detent element to said console after said adjustment of the tension in the transmission cable.

11. The floor console assembly of claim 10 in which the console assembly includes said housing having a top panel with an opening, a trim plate in said opening, said locking mechanism comprising a locking member protruding downwardly from said trim plate and engaging said detent element to lock said detent element in place to said console assembly.

12. The floor console assembly of claim 11 in which said opening includes first spaced sides and said detent element has second-spaced sides located within and spaced from said first spaced sides;

said locking member protruding downwardly between said first and second sides; and said first and second sides and said locking member being shaped to lock said detent element in place to said console assembly.

13. The console assembly of claim 12 in which said sides are serrated to form combs on each side and said locking member includes surfaces for engaging selected serrated surfaces of said combs to lock the detent element in place.

14. The console assembly of claim 10 in which said console assembly includes a base having two spaced upstanding sides between which said shift lever is pivoted; flanges at the upper ends of said sides on which said detent element is supported.

15. The console assembly of claim 11 in which said console assembly includes a base having two spaced upstanding sides between which said shift lever is pivoted; flanges at the upper ends of said sides on which said detent element is supported.

16. The console assembly of claim 15 in which the detent element includes a detent protrusion extending upwardly through said opening and said trim plate includes a clearance opening for receiving said detent protrusion; said detent protrusion having detent notches located on the under surface of said detent protrusion and defining transmission gear positions for said shift lever; and said shift lever having a pawl extending laterally therefrom into said notches.

17. A method of adjusting the tension of a shifting cable for a vehicle transmission to be attached to a shifter assembly located in a vehicle console comprising:

providing a first cable connector extending from the transmission of a vehicle;

providing a console in which a shift lever assembly is pivotally mounted, said shift lever assembly having a pawl and a shift lever cable connector adapted for connection to said first cable connector;

providing a detent element in said console, said detent element having a plurality of detent notches for receiving said pawl at various gear positions, said detent element being arranged before completion of the assembly of the console in a vehicle to move within said console;

providing a trim plate mountable on said console and having a locking member engagable with said detent element and console for locking said detent element to said console;

setting the transmission of said vehicle to one of said transmission gear positions;

setting said pawl in one of said notches corresponding to said one of said transmission gear positions;

moving said console with shift lever so as to connect said shift lever cable connector to said first cable connector extending from said transmission;

moving said detent element while said pawl is set in said one notch to adjust the tension in said transmission cable; and therefore moving said trim plate to engage said locking member of said trim plate with said detent element and console to lock said detent element in place relative to said console.

18. The method of claim 17 in which a base is provided in said console for pivotally mounting said shift lever assembly and said base is utilized for guiding and supporting said detent element during movement of said detent plate before being locked in place and for supporting said detent element after being locked in place.

19. The method of claim 18 in which said detent plate is biased in one direction along which said cable extends.

20. A method of installing a floor console for a vehicle in which said floor console is located a shift lever mechanism including a shift lever to which is attached a shift lever cable connector for connection to a transmission cable connector of a transmission cable, said shift lever positional in one of several different gear positions in a detent element provided for locating the shift lever in said several different shifted gear positions comprising:

initially movably mounting said detent element in said console movable relative to said console with said lever in one of said different shifted gear positions;

moving said console in place in said vehicle while causing said shift lever cable connector to mate and connect with said transmission cable connector of said transmission cable;

moving said detent element and said shift lever together while said shift lever is positioned in said one gear position with respect to said detent element to adjust the tension in said transmission cable; and thereafter locking said detent element to said console.

21. The method of claim 20 in which said detent plate is biased in one direction along which said cable extends.

22. The method of claim 20 in which a trim plate having a first locking element is provided;

said console is provided with a housing having a second locking element;

said detent element is provided with a third locking element; and after said shift lever cable connector is mated with said transmission cable connector said first locking element is engaged with said second and third locking elements to lock said detent element to said console.

* * * * *